Nov. 3, 1953     A. L. WOOLFOLK     2,658,135

DETACHABLE LIGHT

Filed Nov. 21, 1951

INVENTOR

A. L. Woolfolk

BY Mason, Fenwick & Lawrence

ATTORNEYS

Patented Nov. 3, 1953

2,658,135

UNITED STATES PATENT OFFICE 2,658,135

DETACHABLE LIGHT

Anderson L. Woolfolk, Pendletons, Va.

Application November 21, 1951, Serial No. 257,533

2 Claims. (Cl. 240—8.2)

This invention relates to improvements in detachable lights, and particularly to such lights which are peculiarly adapted for use on vehicles.

Trucks, trailers and the like are required by law to display riding lights at night, which lights are so positioned to indicate the outline of the truck or trailer body. This is a safety feature to show other vehicles the clearance necessary in passing the truck, whether the vehicles be travelling in the same or opposite directions to that of the truck. A great many trucks and trailers are used by those who find it necessary to go into very narrow woods roads, and in many instances directly into the woods. Tree limbs, bushes, brush, etc., will almost invariably break the riding lights, or tear them from the trucks. This is not noticed usually by the driver, with the consequence that the truck is taken later upon the main highways without the proper lights, in violation of the law and as a hazard to other traffic.

The object of the present invention is to provide a riding light for such vehicles which is readily removable, so that all the lights may be taken off and stored in a safe place when the vehicle is to be taken into the woods, and replaced when the vehicle is to be driven on the highways at night.

Another object of the invention is to provide means for positively locking the light in place in its socket when in use so that it may not become accidentally shaken loose and lost which the vehicle is in motion.

A still further object is the provision of auxiliary means to prevent loss of the light if it should become disconnected from its socket, which means also serves as a closure for the socket when the light is removed.

Other objects of the invention will become apparent from the following description when taken in conjunction with the drawings which accompany, and form a part of, this specification.

Figure 1:
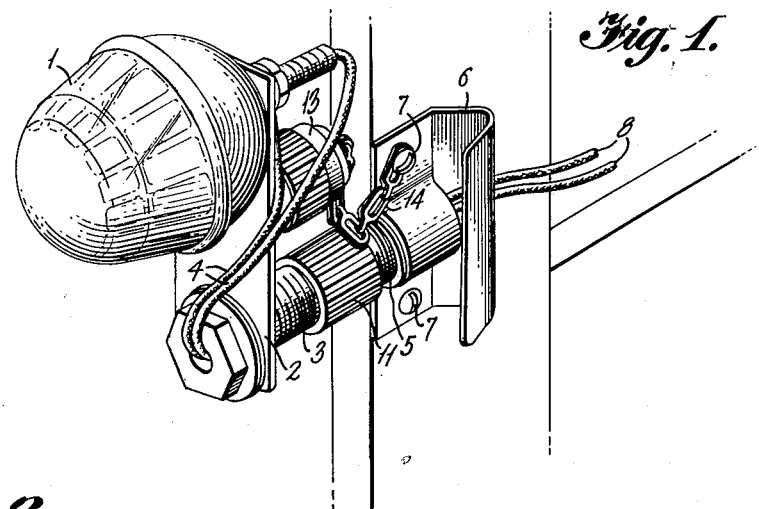
Figure 1 is a perspective view of a light constructed in accordance with the principles of the present invention, the light being shown mounted upon a convenient portion of a vehicle body.

Referring to the drawings in detail, a light 1, of any conventional type suitable for use as a riding light, is mounted upon a bracket 2. The bracket also carries a conventional electric plug 3. Wiring 4 connects the light to the terminals of the plug.

A socket 5 is secured to a mounting bracket 6 and becomes a fixed part of the truck or trailer body. The bracket 6 is attached to the body by means of screws 7 or in any other suitable way. The socket is connected to the source of electrical power carried by the vehicle by means of the wires 8.

With this arrangement, current will be available in the socket at all times, and the light becomes operative when the prongs 9 of the plug are inserted into the openings 10 of the socket.

Due to the jolting and vibration which is bound to occur while the vehicle is in use, there is likelihood that the light may become dislodged from the socket and lost. To prevent this, means are provided to lock the light in place after it has been plugged into the socket. This comprises in part a locking member to hold the light fixed to the socket, and in part a guard to prevent loss of the light if it should accidentally become detached from the socket.

Figure 2:
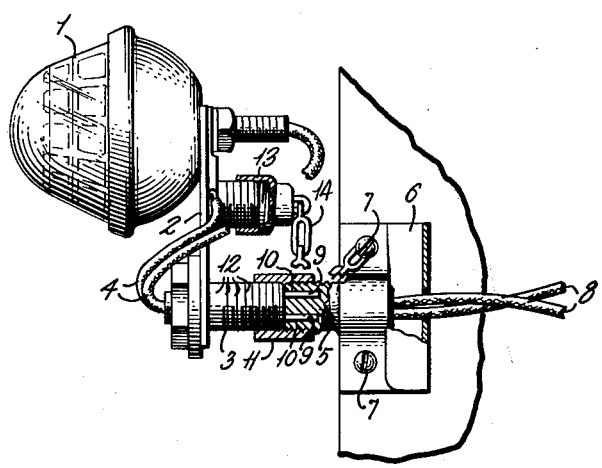
Figure 2 is a side elevation of the light, parts being broken away in section; and, Figure 3 is a side elevation of the socket portion with its closure in place.
Figure 3:
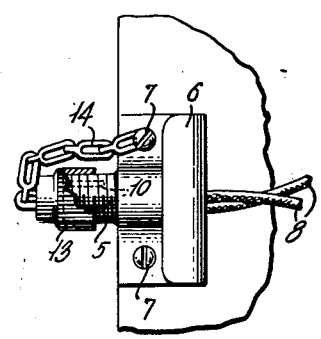

The locking member is in the form of a threaded sleeve 11 mounted on the threads 12 of the plug 3. The plug is threaded for a sufficient portion of its length to receive the entire sleeve 11. The socket 5 is also threaded on its outer end, and when the plug is inserted in the socket the sleeve may be rotated to move it partly upon the socket as shown in Figure 2. When the sleeve is in this position, the light will be securely locked to the socket.

The guard is in the form of a threaded cap 13 which is attached to the socket mounting bracket 6 by means of a chain 14. A threaded stud 15 is provided on the light bracket 2 to receive the cap 13, and when the cap is threaded upon the stud 15 the light unit will be tied to the socket bracket to prevent its loss if the locking sleeve should work free from the threads of the socket or the operator should mount the light without moving the sleeve to locking position.

When the light is to be removed from the truck, the cap 13 is unscrewed from the stud 15, the sleeve 11 screwed all the way back on the plug 3 to be free from the threads on the socket, and the light unit pulled from the socket. When the light has been removed, the cap 13 may be threaded on the socket 5 to protect the socket from dirt and moisture.

When a truck is equipped with these lights, the operator may remove them and cover his sockets before going into the woods. This will prevent the lights from becoming broken and will protect the sockets. When it is necessary to go out upon the highway at night the lights may be put in place in the sockets and locked, and the operator may proceed without fear of the lights becoming lost.

Although the invention has been described with particular reference to trucks which are to be used in woods, it is equally useful as an auxiliary to the standard lighting system of trucks and trailers. In other words, one of the sockets of the present invention may be mounted adjacent each of the riding lights of the truck; and in the event of failure of one of the lights the detachable lamp of the present invention may be inserted in its socket and the truck may then proceed with its full complement of lights.

While in the above one practical embodiment of the invention has been disclosed, it will be apparent that changes may be made from the precise structure shown without departing from the scope of the appended claims.

What is claimed is:

1. A detachable light for motor vehicles comprising, a socket to be fixed to the vehicle, a light unit including a light and a plug by means of which the light unit may be connected to said socket, said light unit having a threaded stud thereon and said socket being externally threaded, and a threaded cap connected by flexible means to said vehicle to be threaded upon said stud when said light unit is engaged in said socket and to be threaded upon said socket when the light unit is removed therefrom.

2. A detachable light for motor vehicles comprising, a socket to be fixed to the vehicle, a light unit including a light, a bracket to which the light is attached and a plug by means of which the light unit may be connected to said socket, said socket and plug each having external screw threads and said bracket having a screw-threaded stud thereon, an internally threaded sleeve adapted to be threaded onto said plug and movable partially onto said socket to form a threaded union between said plug and said socket, and a threaded cap connected by flexible means to said vehicle to be threaded upon said stud when said light unit is engaged in said socket and to be threaded upon said socket when the light unit is removed therefrom.

ANDERSON L. WOOLFOLK.

References Cited in the file of this patent

UNITED STATES PATENTS

| Number | Name | Date |
|---|---|---|
| 1,362,992 | Haywood et al. | Dec. 21, 1920 |
| 1,496,140 | Tuttle | June 3, 1924 |